United States Patent [19]
Enoch

[11] 3,916,928
[45] Nov. 4, 1975

[54] ATTITUDE SENSITIVE FUEL TANK VENT VALVE

[75] Inventor: William K. Enoch, Hurst, Tex.

[73] Assignee: Textron, Inc., Providence, R.I.

[22] Filed: Sept. 24, 1973

[21] Appl. No.: 399,698

[52] U.S. Cl. .................................. 137/39; 137/43
[51] Int. Cl.² .......................................... F16K 17/36
[58] Field of Search .............................. 137/39, 43

[56] References Cited
UNITED STATES PATENTS

| 1,683,338 | 9/1928 | Evinrude | 137/43 |
|---|---|---|---|
| 2,194,348 | 3/1940 | Zoder | 137/43 |
| 2,919,707 | 1/1960 | Seidler | 137/39 |
| 3,548,847 | 12/1970 | Roven | 137/43 |
| 3,765,435 | 10/1973 | Schlanzky | 137/39 |
| 3,768,498 | 10/1973 | Urban | 137/43 |

FOREIGN PATENTS OR APPLICATIONS

| 1,183,021 | 1/1959 | France | 137/43 |

Primary Examiner—Robert G. Nilson
Attorney, Agent, or Firm—Richards, Harris & Medlock

[57] ABSTRACT

An attitude sensitive control valve for an aircraft fuel tank employing a cup having a central port in the bottom and adapted to be secured inverted to a fuel tank panel to vent the tank through the port. A cap for the cup has end walls sloping to the cup axis with a float having a gasket on the end adjacent to the port to close the port when moved to the bottom of said cup. The other end of the float has a domed surface which cooperates with a heavy sphere which rolls along the walls of the cap to move the float to closure of the port when the tank tilts to an angle where the thrust from the sphere exceeds the weight of the float.

8 Claims, 7 Drawing Figures

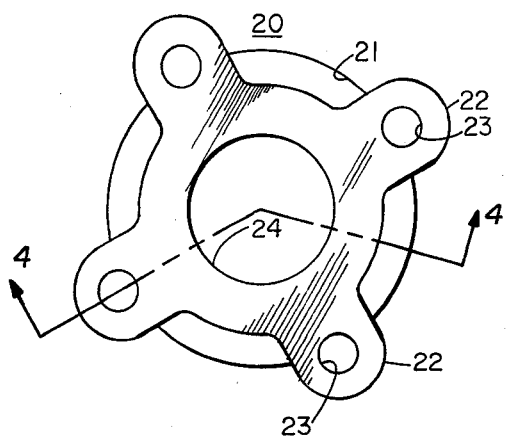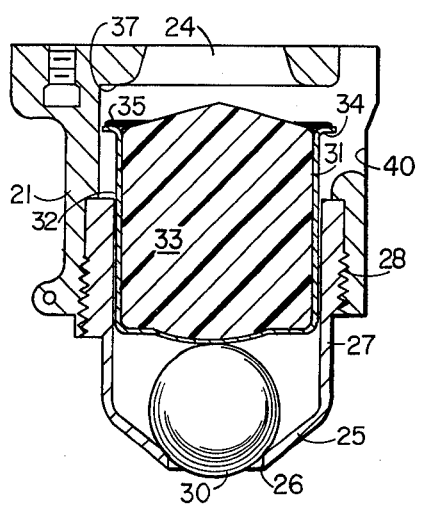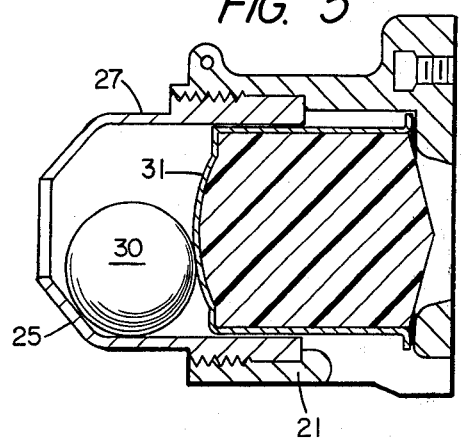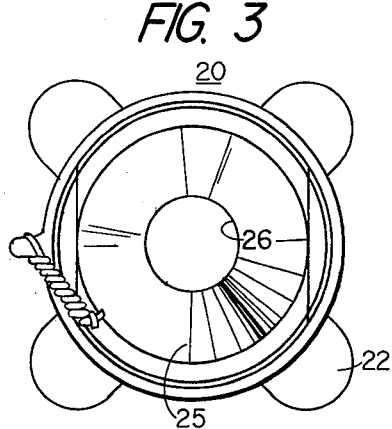

ATTITUDE SENSITIVE FUEL TANK VENT VALVE

This invention relates to control of the fuel tank vent in aircraft, and more particularly to the automatic closure of a fuel tank vent when the attitude of the aircraft assumes a given deviation in attitude.

Gas tanks in aircraft normally are provided with a vent through which air escapes as fuel is introduced into the tank and through which air passes into the tank as fuel is being used by the engine.

In operation of such systems, it is highly desirable from a safety standpoint that such vents be closed if the aircraft should tip over to prevent release of fuel and minimize the danger of fire. Various types of roll over valves have heretofore been employed. The present invention is directed to a structure which is simple in its construction and which serves positively to close the vent when the aircraft attitude changes from level to or beyond some predetermined minimum limits.

In accordance with the present invention, there is provided a valve cup inverted with a port in the bottom plate thereof and adapted to be secured to and form the vent opening for a fuel tank. A float is mounted in the cup with upward facing surfaces adapted to engage the valve seat at the port. The float is caged in a cap having the end thereof opposite the port of conical shape. A sphere mounted in the cap cooperates with the inclined walls of the cap and a dome shaped end of the float opposite the port to force the float to engage the valve seat at the port.

A lateral passage extends into the cup at a point adjacent to the bottom plate for flow of air therethrough.

For a more complete understanding of the present invention and for further objects and advantages thereof, reference may now be had to the following description taken in conjunction with the accompanying drawings, in which:

FIG. 2 is a top view of the control valve of FIG. 1;

FIG. 3 is a bottom view of the control valve of FIG. 1;

FIG. 4 is a sectional view of the valve of FIG. 1 in the open position;

FIG. 5 is a sectional view of the valve in a closed position;

Figure 1:
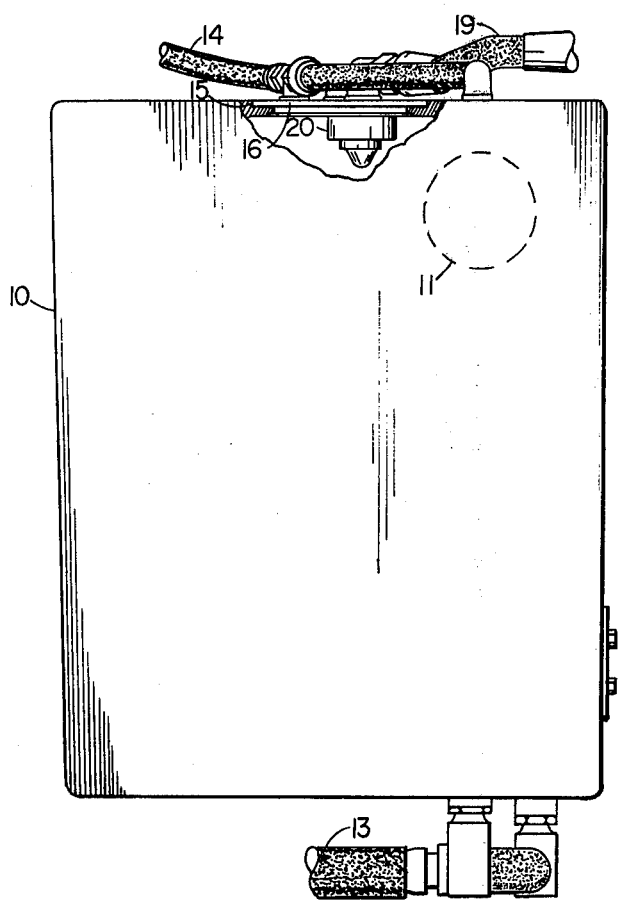
FIG. 1 is a partially broken away view illustrating a fuel tank of an aircraft.

In FIG. 1 the upper end of an aircraft fuel tank has been illustrated. In this embodiment, the fuel tank 10 is provided with a gravity filling port 11. Normally, several tanks are employed in an aircraft interconnected by way of lines such as crossover line 13. Also interconnecting tank 10 to the other tanks are vent lines such as line 14. Auxiliary tanks are vented separately or into the overboard vent line 19. In order to fill or empty the fuel tank system, it is necessary that there be provided a vent through which air may pass. In accordance with the present invention, an opening 15 is formed in the upper surface of tank 10. A plate 16 closes the opening 15. An attitude sensitive valve 20 is then secured to plate 16 and serves to control the vent opening leading through the plate 16 to overboard vent line 19 leading to atmosphere.

FIG. 2 illustrates a preferred form of the control valve 20. Body 21 of valve 20, FIG. 2, is of the form of an inverted cylindrical cup. The upper end of body 21 is provided with four feet, such as feet 22, into which holes 23 extend to accommodate bolts which are employed for securing the valve 20 to plate 16 inside tank 10, FIG. 1. A central aperture 24 of cylindrical shape is formed in the top of body 21.

As shown in FIG. 3, a cap for cup 21 has the lower end thereof conical shape, the conical section 25 being truncated to form a central aperture 26.

As best shown in FIG. 4, inverted cylindrical cup 21 has a closure cap 27 secured thereto by means of a threaded section 28 at the mouth of the cup 21.

A heavy sphere such as a steel ball 30 is contained within the cap 27.

A float 31 is also housed within the cup 21 and cap 27. The float 31 is of cylindrical shape including an upright cylindrical metallic cup 32 filled with a rigid plastic foam float body 33. The lip 34 of cup 32 supports and has adhered thereto a molded rubber gasket 35 which will engage the bottom of the cup at the shoulder portion. When the float gasket 35 contacts shoulder 37, the port 24 is closed.

The cup 21 is provided with at least one lateral aperture such as the aperture 40 which extends through the side wall of the cup adjacent to the bottom surface.

FIG. 5 illustrates the float 31 moved into sealing position when the tank including the valve 20 tilts to the point that the thrust on the float exerted by the ball 30 overcomes the weight of the float resting on the ball. The effective gravitational forces change as the tilt increases. For example, when an aircraft containing tank 10 is lying on its side, the ball 30 forces the valve to be completely closed.

Figure 7:
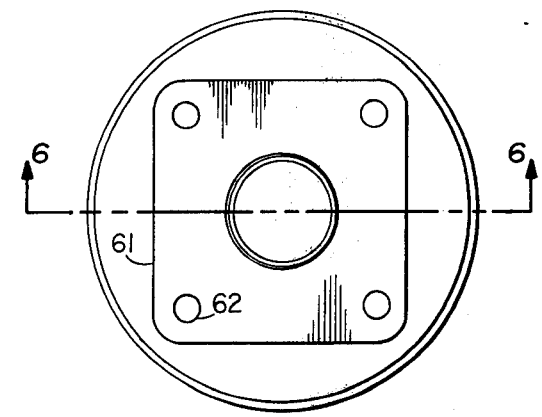
FIG. 7 is a top view of the valve body of FIG. 6.
Figure 6:
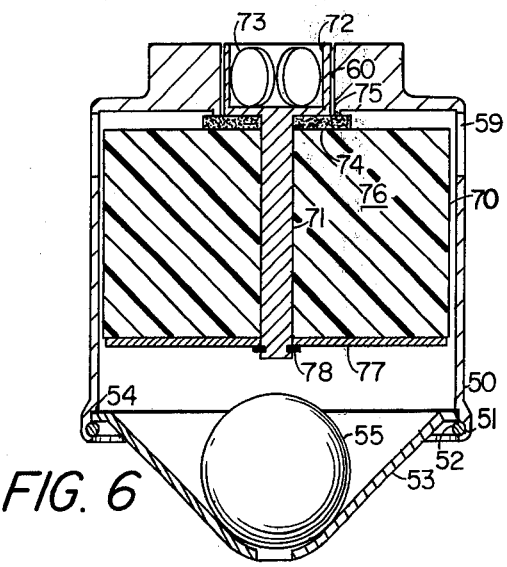
FIG. 6 illustrates a modification of the invention.

FIG. 6 illustrates in section a modification of the invention. An inverted cup 50 has a groove 51 near the lip thereof on which a retainer spring 52 is nested. The perimeter of a conical cap 53 rests against a shoulder 54. A ball 55 is contained in the cap 53. Cup 50 is provided with a central port 60. As best shown in FIG. 7, the bottom of the cup 50 is in the form of rectangular pedestal 61. Holes 62 are formed in the pedestal so that the cup can be secured to the top panel of a fuel tank.

A float 70, FIG. 6, is mounted in cup 50. The float 70 includes a central rod 71 having on the upper end thereof a thin walled cup 72 with lateral holes 73 formed therein. A gasket 74 is mounted on rod 71 adjacent the cup 72 and has a perimeter extending beyond the walls of the cup 72 so that the gasket can seal on a downwardly extending lip or shoulder 75 in cup 50. A body 76 of float material cylindrical in form, is mounted on rod 71. A closure washer 77 is also mounted below the body 76 with a lock spring 78 securing the elements together.

An aperture 59 is formed in the side wall of cup 50. This embodiment of the invention operates generally the same as shown in FIGS. 2–5 with the float 70 sealing aperture 60 when the thrust exerted by ball 55 exceeds the weight of the float 70.

In one embodiment, the cup 50, FIG. 6, was about 3 inches in diameter.

The valve system serves to provide vent control for fuel tanks in aircraft such as helicopters. In each case, a cup having a central port in the bottom is adapted to be secured inverted in a fuel tank panel to provide a vent for the tank through the port. A cap for the cup has end walls sloping to the axis of the cup. A float in the cup has on the end adjacent the port a gasket to close the port when moved to the bottom of the cup and having a domed surface on the opposite end. A sphere in the cap rolls along the walls of the cap when inclined to move the float to close the vent any time the thrust from the sphere exceeds the weight of the float.

Having described the invention in connection with certain specific embodiments thereof, it is to be understood that further modifications may now suggest themselves to those skilled in the art and it is intended to cover such modifications as fall within the scope of the appended claims.

What is claimed is:

1. An attitude sensitive control valve for an aircraft fuel tank and comprising:
   a. a cup defining an elongated cylindrical walled chamber having a central port in the bottom and a lateral aperture in the side thereof, said cup adapted to be secured inverted to a fuel tank panel to vent said tank through said port,
   b. a cap mounted at the mouth of said cup having end walls sloping to the axis of said cup,
   c. an elongated cylindrical float in said cylindrical walled chamber in said cup having on the end adjacent said port a gasket to close said port when moved to the bottom of said cup and having on the opposite end a domed surface, and
   d. a heavy sphere in said cap which rolls along the walls of said cap to contact and move said float when said tank tilts to an angle where the thrust from said sphere exceeds the weight of said float.

2. The combination set forth in claim 1 wherein a passage smaller than said sphere is formed in the end of the cap.

3. The combination set forth in claim 1 in which the end of said cap has a conical wall.

4. The combination set forth in claim 1 wherein said cap has a conical end wall and a cylindrical side wall which threadedly engages the mouth of said cup and a passage smaller than said sphere is formed in the apex of the conical wall.

5. The combination set forth in claim 1 wherein a shoulder to engage said gasket is formed on the bottom of said cup.

6. The combination set forth in claim 1 wherein said float comprises a rigid float cup filled with floatation material, a flange extending radially outward from said cup, and a shoulder is formed in said cylindrical walled chamber for selectively engaging said flange to limit axial movement of said float in a direction away from said port.

7. An attitude sensitive control valve for an aircraft fuel tank and comprising:
   a. a valve cup defining an elongated cylindrical walled chamber having a central port in the bottom and a lateral aperture in the side thereof, and laterally extending feet securing said cup in an inverted position to the top panel of said fuel tank to vent said tank through said port,
   b. a cap mounted on said cup having end walls sloping to the axis of said cup,
   c. an elongated cylindrical float cup in said valve cup, the mouth of which faces said central port, said valve cup filled with floatation material and having, on the end adjacent said port, a gasket to close said port when moved to the bottom of said cup and having on the opposite end a domed surface, and
   d. a heavy sphere in said cap which rolls along the walls of said cap to move and contact said float when said tank tilts to an angle where the thrust from said sphere exceeds the weight of said float.

8. The combination set forth in claim 7 wherein a radially extending flange is formed on the exterior of said float cup, and a shoulder is formed in said valve cup for selectively engaging said flange to limit axial movement of said float in a direction away from said port.

* * * * *